United States Patent
Tsunashima et al.

(10) Patent No.: US 11,533,410 B2
(45) Date of Patent: Dec. 20, 2022

(54) INFORMATION PROCESSING APPARATUS AND NON-TRANSITORY COMPUTER READABLE MEDIUM STORING PROGRAM TO PERFORM ARITHMETIC OPERATION BY USING CONNECTED ARITHMETIC DEVICE

(71) Applicant: FUJIFILM Business Innovation Corp., Tokyo (JP)

(72) Inventors: Shunji Tsunashima, Kanagawa (JP); Nobukazu Miyoshi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 402 days.

(21) Appl. No.: 16/211,245

(22) Filed: Dec. 6, 2018

(65) Prior Publication Data
US 2019/0245998 A1 Aug. 8, 2019

(30) Foreign Application Priority Data
Feb. 8, 2018 (JP) .............................. JP2018-020921

(51) Int. Cl.
*H04N 1/00* (2006.01)
*G06F 13/10* (2006.01)

(52) U.S. Cl.
CPC ....... *H04N 1/00965* (2013.01); *G06F 13/102* (2013.01)

(58) Field of Classification Search
CPC ........... H04N 1/00965; H04N 1/00885; H04N 1/00907; H04N 1/32502; H04N 1/32512; H04N 1/32523; H04N 1/32593; G06F 3/1278; G06F 3/1279; G06F 3/1297; G06F 13/102

USPC ........................................................ 358/1.15
See application file for complete search history.

(56) References Cited

U.S. PATENT DOCUMENTS

| 2006/0221367 | A1* | 10/2006 | Shiokawa | H04N 1/00233 358/1.13 |
| 2009/0225349 | A1* | 9/2009 | Hirai | G06F 3/1229 358/1.15 |
| 2018/0284865 | A1* | 10/2018 | Shimamura | G06F 3/1279 |
| 2019/0199884 | A1* | 6/2019 | Shimamura | H04N 1/00965 |

FOREIGN PATENT DOCUMENTS

| JP | 2015114882 | 6/2015 |
| JP | 2016009995 | 1/2016 |
| JP | 2016201058 | 12/2016 |
| JP | 2017005320 | 1/2017 |

OTHER PUBLICATIONS

Office Action of Japan Counterpart Application, with English translation thereof, dated Nov. 16, 2021, pp. 1-6.

* cited by examiner

*Primary Examiner* — Kent Yip
(74) *Attorney, Agent, or Firm* — JCIPRNET

(57) ABSTRACT

An information processing apparatus includes a detection unit that detects a connection of an arithmetic device, a specifying unit that specifies an arithmetic operation capable of being performed by the arithmetic device, a transfer unit that transfers data used in the arithmetic operation to the arithmetic device in a case where the specified arithmetic operation is determined to be performed by the information processing apparatus before the connection, and an acquisition unit that acquires a result obtained by the arithmetic device performing the arithmetic operation using the data.

12 Claims, 5 Drawing Sheets

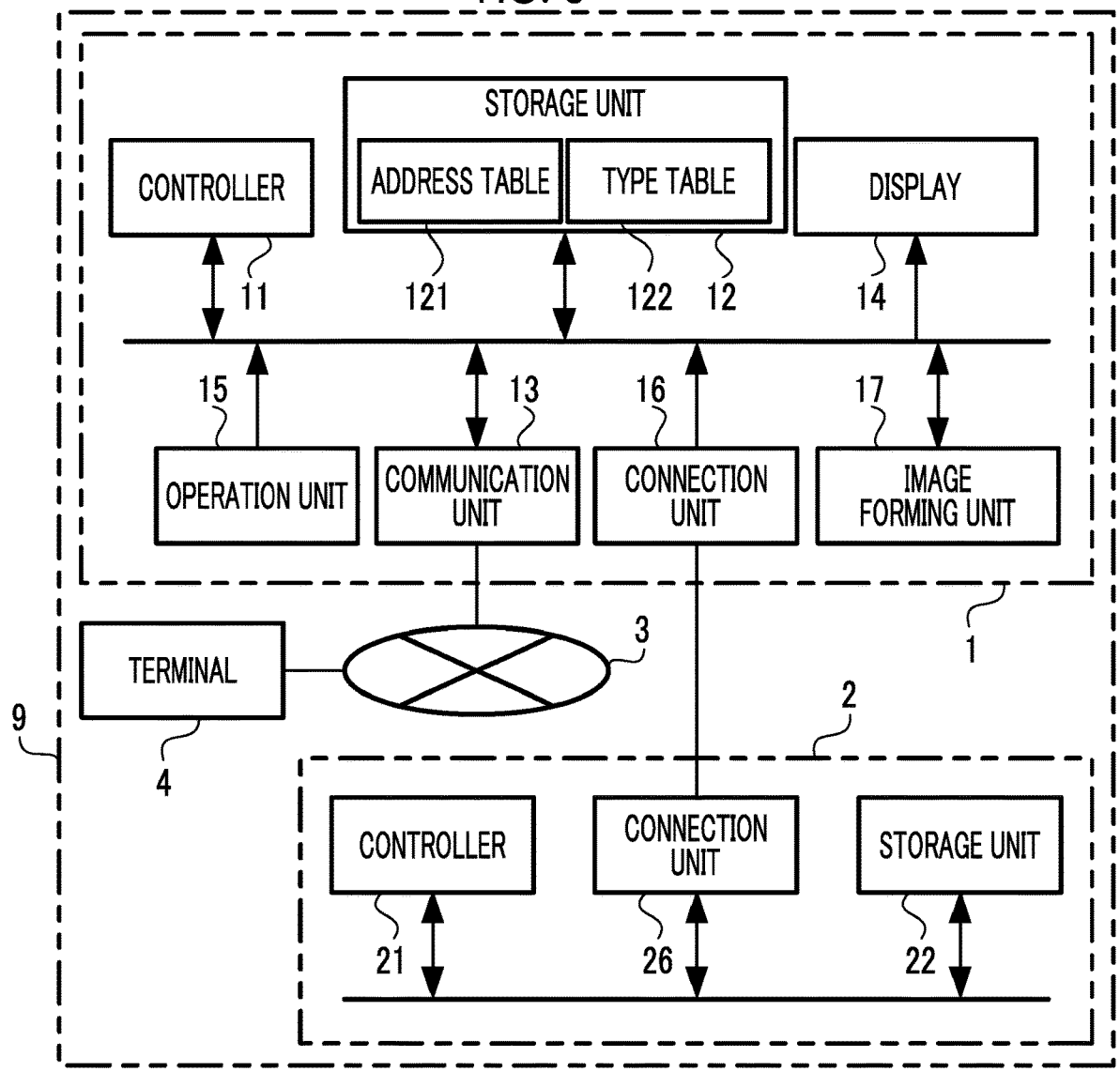

| PROTOCOL | PORT NUMBER | ADDRESS |
|---|---|---|
| tcp | 9100 | 192.168.0.7 |
| tcp | 515 | 192.168.0.7 |
| tcp | 631 | 192.168.0.7 |
| tcp | 137 | 192.168.0.7 |
| tcp | 138 | 192.168.0.7 |
| tcp | 139 | 192.168.0.7 |

—121

| PROTOCOL | PORT NUMBER | ARITHMETIC OPERATION TYPE |
|---|---|---|
| tcp | 9100 | F01 |
| tcp | 515 | F02 |
| tcp | 631 | F03 |
| tcp | 137 | F04 |
| tcp | 138 | F04 |
| tcp | 139 | F04 |

—122

INFORMATION PROCESSING APPARATUS AND NON-TRANSITORY COMPUTER READABLE MEDIUM STORING PROGRAM TO PERFORM ARITHMETIC OPERATION BY USING CONNECTED ARITHMETIC DEVICE

CROSS-REFERENCE TO RELATED APPLICATIONS

This application is based on and claims priority under 35 USC 119 from Japanese Patent Application No. 2018-020921 filed Feb. 8, 2018.

BACKGROUND

(i) Technical Field

The present invention relates to an information processing apparatus and a non-transitory computer readable medium storing a program.

(ii) Related Art

"An embedded system" in which computers are incorporated into machines, equipment, devices, and the like in order to realize a specific function has been developed.

In some embedded systems, the function can be extended by connecting the system with hardware later. JP2015-114882A discloses an information processing apparatus that includes means for detecting a change of a configuration in a case of transitioning to a power ON state from a fast start standby state. In the information processing apparatus, in a case where the configuration is changed, restart processing is performed, and then the state transitions to the power ON state.

SUMMARY

However, extensible hardware in the embedded system is limited to those dedicated to the embedded system, and is determined at the design stage in many cases. Therefore, in a case where processing performance of the incorporated computer (information processing apparatus) is insufficient, it is necessary to require the embedded system with a new one.

Aspects of non-limiting embodiments of the present disclosure relate to an information processing apparatus and a non-transitory computer readable medium storing a program that compensate for a lack of processing performance without replacing the main body of an information processing apparatus in a case where the processing performance of the information processing apparatus is insufficient.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus which includes a detection unit that detects a connection of an arithmetic device, a specifying unit that specifies an arithmetic operation capable of being performed by the arithmetic device, a transfer unit that transfers data used in the arithmetic operation to the arithmetic device in a case where the specified arithmetic operation is determined to be performed by the information processing apparatus before the connection, and an acquisition unit that acquires a result obtained by the arithmetic device performing the arithmetic operation using the data.

BRIEF DESCRIPTION OF THE DRAWINGS

Exemplary embodiment(s) of the present invention will be described in detail based on the following figures, wherein:

FIG. 3 is a diagram illustrating an example of the configuration of the information processing system 9;

DETAILED DESCRIPTION

Exemplary Embodiment

Overall Configuration of Information Processing System

Figure 1:
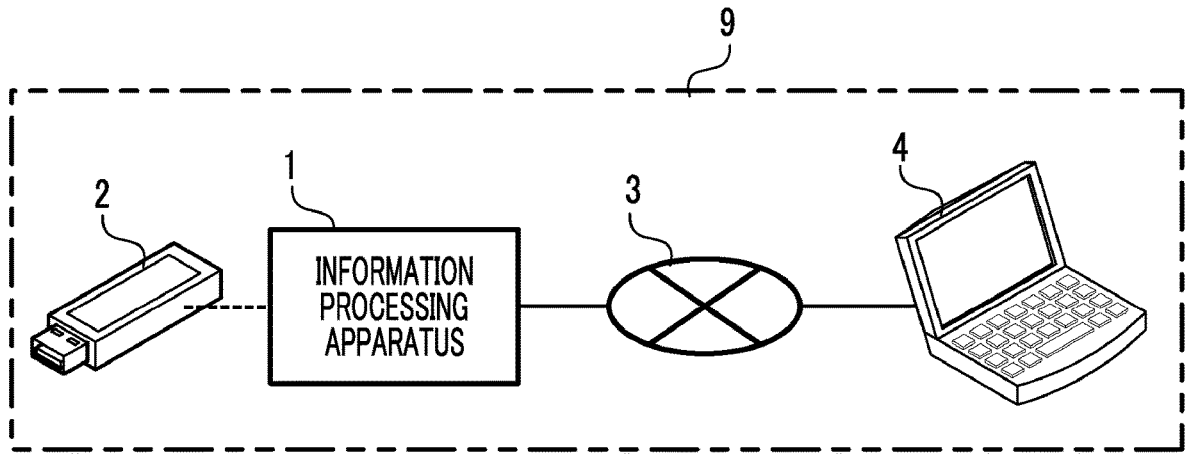
FIG. 1 is a diagram illustrating a configuration of an information processing system 9 according to an exemplary embodiment.

FIG. 1 is a diagram illustrating a configuration of an information processing system 9 according to an exemplary embodiment. The information processing system 9 includes an information processing apparatus 1, an arithmetic device 2, and a terminal 4. The information processing system 9 includes a communication line 3 that connects the information processing apparatus 1 and the terminal 4 to enable communication with each other. The information processing system 9 may include a plurality of information processing apparatuses 1, a plurality of arithmetic devices 2, a plurality of communication lines 3, and a plurality of terminals 4.

The information processing apparatus 1 causes an arithmetic operation, which is determined to be performed by the information processing apparatus 1, to be performed by the connected arithmetic device 2. In the exemplary embodiment, the information processing apparatus 1 is an image forming apparatus that forms an image on a medium such as paper.

Regarding the arithmetic device 2, the model number, the type, or the like of a connectable device is not limited in advance. The arithmetic device 2 maybe used by being connected to a device having a different model number, type, or the like. The arithmetic device 2 is a general-purpose device that performs an arithmetic operation in accordance with a designated computer program (simply referred to as a program below). Thus, the arithmetic device 2 may perform various arithmetic operations by changing a program to be read.

The terminal 4 receives an operation of a user and transmits an instruction corresponding to the received operation to the information processing apparatus 1.

The communication line 3 connects the information processing apparatus 1 and the terminal 4 to enable communication with each other. For example, a local area network (LAN) is provided as the communication line. The communication line 3 may be a wide area network (WAN) or the Internet, or may be a combination thereof, in addition to the LAN.

In the information processing system 9 illustrated in FIG. 1, for example, a user operates the terminal 4 to instruct the information processing apparatus 1 to perform image forming processing via the communication line 3.

Configurations of Information Processing Apparatus and Arithmetic Device

Figure 2:
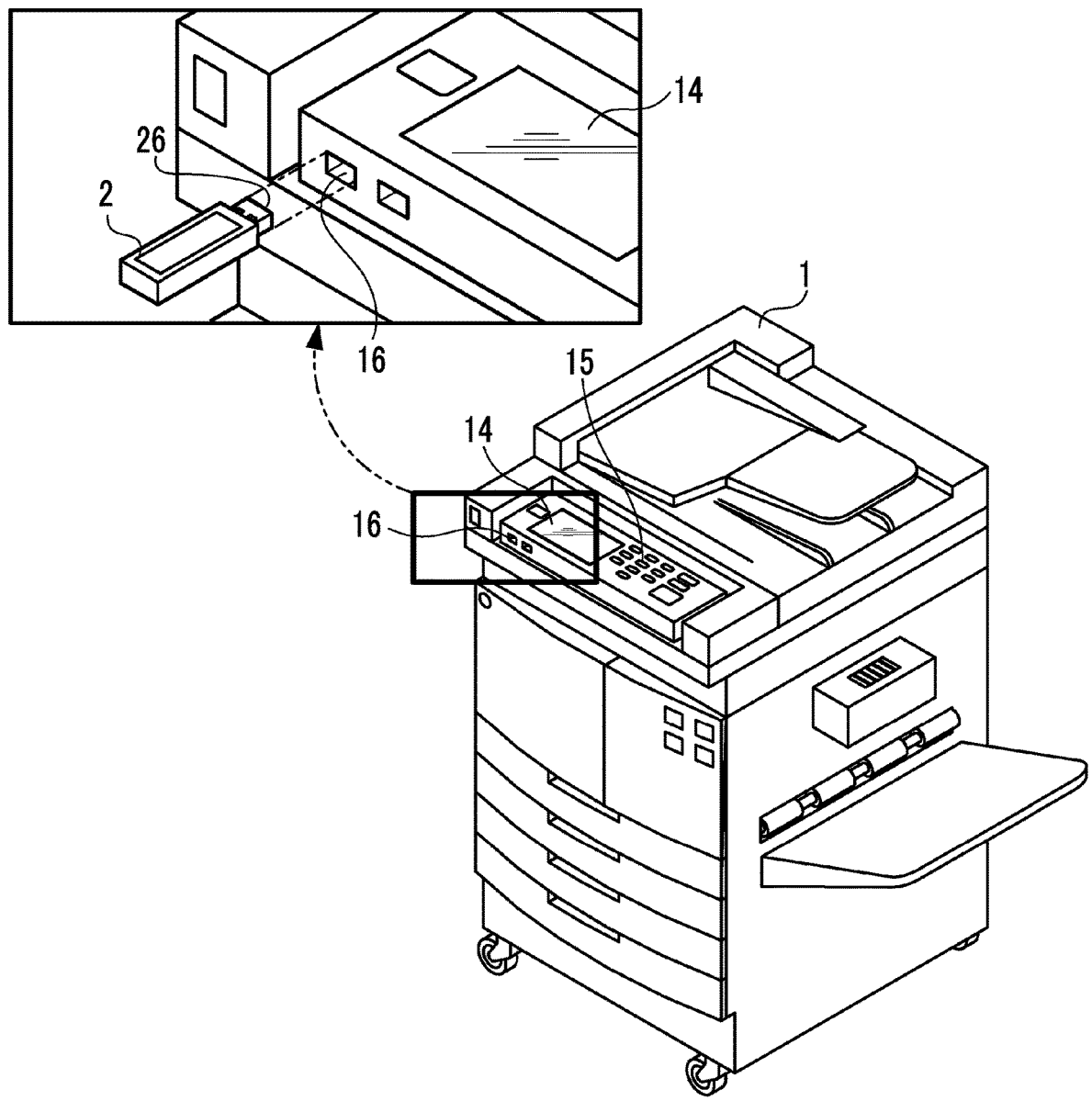
FIG. 2 is a diagram illustrating an example of an appearance of an information processing apparatus 1.

FIG. 2 is a diagram illustrating an example of an appearance of the information processing apparatus 1. FIG. 3 is a diagram illustrating an example of the configuration of the information processing system 9.

As illustrated in FIG. 2, the information processing apparatus 1 is an image forming apparatus that forms an image on a medium. The information processing apparatus 1 includes a control unit 11, a storage unit 12, a communication unit 13, a display unit 14, an operation unit 15, a connection unit 16, and an image forming unit 17.

The control unit 11 includes a central processing unit (CPU), a read only memory (ROM), and a random access memory (RAM). The control unit 11 controls the units of the information processing apparatus 1 by the CPU reading and executing a program stored in the ROM and the storage unit 12.

The storage unit 12 is storage means such as a solid state drive and a hard disk drive. The storage unit stores various programs, data, and the like read by the CPU of the control unit 11.

The storage unit 12 stores an address table 121 and a type table 122. The address table 121 is a table in which a transfer destination of data used in an arithmetic operation is stored for each type of the arithmetic operation. The type table 122 is a table in which the type of an arithmetic operation (second arithmetic operation) capable of being performed by the information processing apparatus is stored.

The communication unit 13 is a communication circuit connected to the communication line 3 in a wired or wireless manner. The information processing apparatus 1 transmits and receives information to and from the terminal 4 connected to the communication line 3, by the communication unit 13.

The operation unit 15 includes operators for performing various instructions, such as operation buttons, a keyboard, and a touch panel. The operation unit receives an operation performed by a user and transmits a signal corresponding to the operation detail to the control unit 11. The information processing apparatus 1 may or may not include the operation unit 15.

The display unit 14 includes a display screen such as a liquid crystal display, and displays an image under the control of the control unit 11. A transparent touch panel of the operation unit 15 may be disposed on the display screen to overlap the display screen.

The image forming unit 17 forms an image on a medium such as paper under the control of the control unit 11, for example, by an electrophotographic method.

The connection unit 16 is an interface for connecting the arithmetic device 2 to the information processing apparatus 1. For example, a universal serial bus (USB) is provided.

For example, it is desirable that the connection unit 16 is an interface capable of so-called "hot swapping" which means that a connection of an arithmetic device 2 may be detected in a state where power is supplied to the information processing apparatus 1, and the information processing apparatus 1 operates. In a case where the connection unit 16 is a USB, the hot swapping is possible.

In the information processing apparatus 1 illustrated in FIG. 2, the display unit 14 and the operation unit 15 are provided at the upper portion of a casing, so as to be directed upwardly. A rectangular hole-like connection unit 16 is provided toward the front.

The arithmetic device 2 illustrated in FIG. 2 is a so-called "stick PC". The arithmetic device has a rectangular parallelepiped shape. The arithmetic device 2 includes a connection unit 26 at one end. The connection unit has a rectangular protrusion.

The arithmetic device 2 includes a control unit 21, a storage unit 22, and a connection unit 26. The control unit 21 includes a CPU, a ROM, and a RAM. The control unit 21 controls the units of the arithmetic device 2 by the CPU reading and executing a program stored in the ROM and the storage unit 22.

The storage unit 22 is storage means such as a solid state drive. The storage unit 22 stores various programs, data, and the like read by the CPU of the control unit 21.

The connection unit 26 is an interface for a connection with the information processing apparatus 1 and is a USB, for example.

As illustrated in FIG. 2, in a case where the connection unit 26 of the arithmetic device 2 is inserted into the connection unit 16 of the information processing apparatus 1, the connection terminal of the connection unit 26 is brought into contact with the connection terminal of the connection unit 16, and thus the arithmetic device 2 and the information processing apparatus 1 become in a state of being electrically linked to each other. That is, the arithmetic device 2 is connected to the information processing apparatus 1.

The control unit 11 of the information processing apparatus 1 detects a connection of the arithmetic device 2 via the connection unit 16 and the connection unit 26, and transmits and receives information to and from the arithmetic device 2. The information processing apparatus 1 may supply power to the arithmetic device 2.

Figures 4A, 4B, 5:
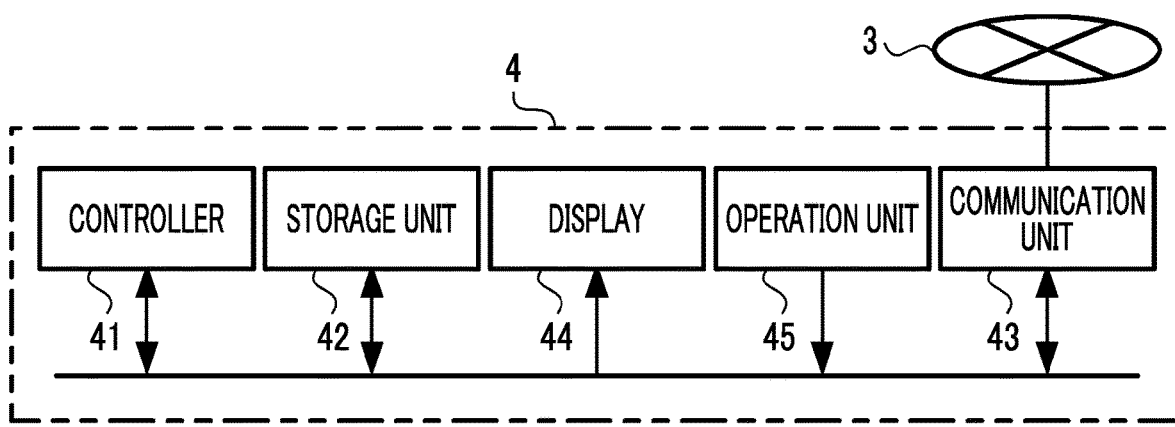
FIGS. 4A and 4B are diagrams illustrating examples of an address table 121 and a type table 122.
FIG. 5 is a diagram illustrating an example of a configuration of a terminal 4.

FIGS. 4A and 4B are diagrams illustrating examples of the address table 121 and the type table 122 stored in the storage unit 12. In the address table 121 illustrated in FIG. 4A, an address of a device is stored for each combination of a protocol and a port number. The address means identification information for identifying a device that transfers data transmitted using the corresponding protocol to a port identified by the corresponding port number. For example, the address is a private address indicated in a manner of Internet protocol version 4 (IPv4) such as "192.168.0.7" as illustrated in FIG. 4A.

The control unit 11 of the information processing apparatus 1 may perform, for example, processing such as a network address translation (NAT) or network address port translation (NAPT), with reference to the address table 121 illustrated in FIG. 4A.

Data used in an arithmetic operation which an instruction of performing is performed by the information processing apparatus 1 is transmitted from the terminal 4 in a combination of a protocol and a port number which are different for each type of the arithmetic operation. Thus, the combination of the protocol and the port number corresponds to the type of the arithmetic operation. The type of the arithmetic operation is associated with the address of a device by the address table 121 illustrated in FIG. 4A.

In the type table 122 stored by the storage unit 12, the type of an arithmetic operation capable of being performed by the information processing apparatus 1 is stored. In the type table 122 illustrated in FIG. 4B, the type of an arithmetic operation capable of being performed by the information processing apparatus 1 is associated with a combination of a protocol and a port number used in a communication in which performing the arithmetic operation of such a type is instructed by the terminal 4.

One type of arithmetic operation may be associated with a plurality of sets of protocols and port numbers. That is, one type of arithmetic operation may be specified from one set of the protocol and the port number.

In a case where an instruction to perform an arithmetic operation is received from the terminal 4, the control unit specifies a protocol of a communication in which the instruction has been performed, and a port number of a port at which the instruction has been received. The control unit 11 searches for a set of the protocol and the port number which have been specified, from the address table 121 in the storage unit 12. In a case where such a set is not shown, the information processing apparatus 1 attempts to perform the arithmetic operation which is a target of the instruction.

The control unit 11 may specify whether or not the arithmetic operation as the target of the instruction is capable of being performed by the information processing apparatus, with reference to the type table 122. In a case where performing the arithmetic operation by the information processing apparatus is not possible, the control unit 11 may notify the terminal 4 that performing the arithmetic operation is not possible.

In a case where the set of the protocol and the port number which have been specified is shown in the address table 121, the control unit 11 transfers data used in the arithmetic operation as the target of the instruction to a device having an address associated with the above set in the address table 121. Since the control unit 11 transfers the data to the device having the above-described address, the control unit 11 instructs a device identified by the address to perform the arithmetic operation using the data. The data to be transferred may include a processing command (for example, a text or a code) for an instruction to perform the arithmetic operation. The processing command may include the type, the condition, and the like of the arithmetic operation.

Configuration of Terminal

FIG. 5 is a diagram illustrating an example of a configuration of the terminal 4. The terminal 4 illustrated in FIG. 5 includes a control unit 41, a storage unit 42, a communication unit 43, a display unit 44, and an operation unit 45. The terminal 4 receives an operation of a user using the operation unit 45 and transmits an instruction to form an image to the information processing apparatus 1 via the communication line 3.

The control unit 41 includes a CPU, a ROM, and a RAM. The control unit 41 controls the units of the terminal 4 by the CPU reading and executing a program stored in the ROM and the storage unit 42. The storage unit 42 is storage means such as a solid state drive and a hard disk drive. The storage unit stores various programs, data, and the like read by the CPU of the control unit 41.

The communication unit 43 is a communication circuit connected to the communication line 3 in a wired or wireless manner. The terminal 4 transmits and receives information to and from the information processing apparatus 1 connected to the communication line 3, by the communication unit 43.

The operation unit 45 includes operators for performing various instructions, such as operation buttons, a keyboard, and a touch panel. The operation unit receives an operation by a user and transmits a signal corresponding to the operation detail to the control unit 41.

The display unit 44 includes a display screen such as a liquid crystal display and displays an image under the control of the control unit 41. A transparent touch panel of the operation unit 45 may be disposed on the display screen to overlap the display screen.

Functional Configuration of Information Processing System

Figure 6:
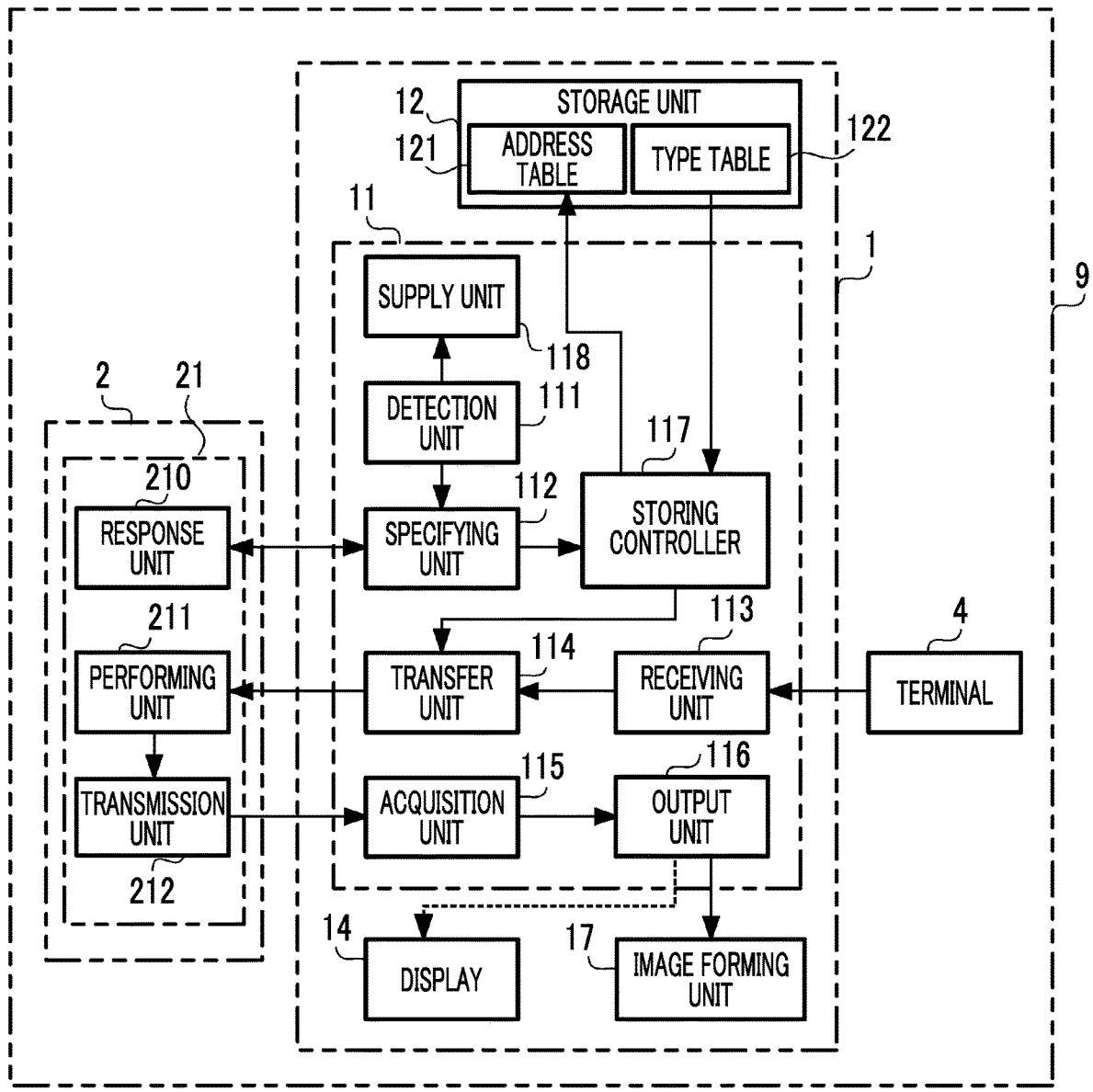
FIG. 6 is a diagram illustrating a functional configuration of the information processing system 9.

FIG. 6 is a diagram illustrating a functional configuration of the information processing system 9. The control unit 11 of the information processing apparatus 1 reads and executes the program stored in the storage unit 12 so as to function as a detection unit 111, a specifying unit 112, a receiving unit 113, a transfer unit 114, an acquisition unit 115, an output unit 116, a storing controller unit 117, and a supply unit 118.

The control unit 21 of the arithmetic device 2 reads and executes the program stored in the storage unit 22 so as to function as a response unit 210, a performing unit 211, and a transmission unit 212. In FIG. 6, illustrations of the communication line 3, the connection unit 16, the connection unit 26, and the communication unit 13 are omitted.

The detection unit 111 monitors the connection unit 16 (not illustrated in FIG. 6) so as to detect the connection of the arithmetic device 2. The information processing apparatus 1 illustrated in FIG. 6 includes the connection unit 16 capable of hot swapping. Thus, in a case where a new arithmetic device 2 is connected to the information processing apparatus in a state where power has been supplied to the information processing apparatus, the detection unit 111 detects the connection of the arithmetic device 2.

The specifying unit 112 specifies an arithmetic operation (first arithmetic operation) capable of being performed by the connected arithmetic device 2.

For example, the specifying unit 112 requires information indicating the type of arithmetic operation capable of being performed by the arithmetic device 2, from the arithmetic device 2. The response unit 210 realized by the control unit 21 of the arithmetic device 2 responds to the request of the specifying unit 112 in a manner of transmitting the information which indicates the type of the arithmetic operation and has been required by the specifying unit 112, to the information processing apparatus 1. The specifying unit 112 acquires the response from the arithmetic device 2, and thus specifies the above-described arithmetic operation.

In a case where the arithmetic operation specified by the specifying unit 112 is determined to be performed by the information processing apparatus 1 before the connection which is detected and is described above, the storing controller unit 117 controls the storage unit 12 to store the arithmetic device 2 as a transfer destination.

In the example illustrated in FIG. 6, the storing controller unit 117 has a function of reading and rewriting the address table 121 stored in the storage unit 12. In a case where the arithmetic operation capable of being performed by an arithmetic device 2 having a connection which has been detected is specified by the specifying unit 112, the storing controller unit 117 determines whether or not the arithmetic operation is determined to be performed by the information processing apparatus 1 before the connection.

For example, the storing controller unit 117 performs the above-described determination in a manner of comparing the type of an arithmetic operation written in the type table 122 to the type of the arithmetic operation capable of being performed by the arithmetic device 2, with reference to the type table 122 stored in the storage unit 12.

In a case where it is determined that the arithmetic operation specified as the arithmetic operation capable of being performed by the arithmetic device 2 is determined to be performed by the information processing apparatus before the connection, the storing controller unit 117 rewrites the address table 121, and thus causes the address of the arithmetic device 2 as the transfer destination of data used in the specified arithmetic operation to be stored in the storage unit 12.

The receiving unit 113 receives an instruction to form an image and image data indicating the image, from the terminal 4.

The transfer unit 114 reads the contents of the address table 121 via the storing controller unit 117 and transfers the image data received by the receiving unit 113 to the arithmetic device 2 in accordance with the contents of the address table 121. Since the transfer unit transfers the image data to the arithmetic device 2, the transfer unit 114 instructs the arithmetic device 2 to perform the arithmetic operation using the image data. The transfer unit 114 may transfer the above-described image data and data including a processing command (such as a text or a code) of an instruction to perform the arithmetic operation using the image data, to the arithmetic device 2.

For example, the transfer unit 114 specifies the protocol used for an instruction received by the receiving unit 113 and a port number indicating a port at which the instruction has been received. The transfer unit 114 causes the storage unit 12 to store an address corresponding to a combination of the protocol and the port number which has been specified. Then, the transfer unit 114 searches for the address from the address table 121 read by the storing controller unit 117. In a case where the above-described address is shown in the address table 121, the transfer unit 114 transfers image data to the arithmetic device 2.

As described above, the specifying unit 112 may specify the first arithmetic operation capable of being performed by the connected arithmetic device 2, and specify the second arithmetic operation capable of being performed by the information processing apparatus with reference to the type table 122 via the storing controller unit 117, for example. For example, in a case where the specifying unit specifies the first arithmetic operation, the specifying unit 112 may specify the second arithmetic operation with reference to the above-described type table 122. In this case, in a case where the first arithmetic operation and the second arithmetic operation which have been specified by the specifying unit 112 have an arithmetic operation overlapping each other, the transfer unit 114 may transfer data used in the overlapping arithmetic operation to the arithmetic device 2. In this case, the storing controller unit 117 may not rewrite the address table 121.

As described above, the address table 121 stores an address as a transfer destination of data used in an arithmetic operation determined to be performed by the information processing apparatus before the connection among specified arithmetic operations. Thus, in a case where the arithmetic operation specified by the specifying unit 112 is determined to be performed by the information processing apparatus before the connection, the transfer unit 114 transfers data used in the arithmetic operation to the arithmetic device 2.

Data transferred to the arithmetic device 2 by the transfer unit 114 includes data used in a portion of a series of processing performed by the information processing apparatus 1, for example, data used in image processing. After the transfer unit 114 transfers the above-described data to the arithmetic device 2, the control unit 11 of the information processing apparatus 1 does not perform processing performed by the arithmetic device 2 using the data. That is, after the transfer unit 114 transfers the above-described data to the arithmetic device 2, the control unit 11 of the information processing apparatus 1 does not perform the arithmetic operation using the data. Thus, calculation resources allocated to the arithmetic operation using the above-described data by the information processing apparatus 1 are not allocated to the arithmetic operation after the above-described data is transferred, and thus the information processing apparatus 1 has an available calculation resource.

In a case where the detection unit 111 detects separation (change from the connected state to a not-connected state) of the arithmetic device 2, the storing controller unit 117 may delete the address of the arithmetic device 2 from the address table 121. After the arithmetic device 2 is separated, the transfer destination of data is not provided. Thus, the control unit 11 of the information processing apparatus 1 may perform the arithmetic operation of which the terminal 4 is instructed.

The performing unit 211 realized by the control unit 21 of the arithmetic device 2 performs an arithmetic operation using image data transferred from the information processing apparatus 1. The transmission unit 212 realized by the control unit 21 transmits a result obtained by the performing unit 211 performing the arithmetic operation, to the information processing apparatus 1.

As the arithmetic operation performed by the performing unit 211, for example, analysis of image data and generation of intermediate data in accordance with the result of the analysis are provided. The image data is described in, for example, a page description language (PDL). The performing unit 211 analyzes the contents of image data described in the PDL and generates intermediate data rasterized in accordance with the size of a medium such as paper. Rasterization means to expand an image indicating the image data in a group of pixels arranged in a form of a lattice. The transmission unit 212 transmits the generated intermediate data to the information processing apparatus 1.

The acquisition unit 115 acquires a result obtained by the arithmetic device 2 performing the arithmetic operation, by using the image data transferred by the transfer unit 114. In the above-described example, the acquisition unit 115 acquires intermediate data generated by the arithmetic device 2.

The output unit 116 outputs information corresponding to the result acquired by the acquisition unit 115. For example, as indicated by a broken line in FIG. 6, the output unit 116 may cause the display unit 14 to display a character string, an image, and the like indicating the above-described information. The information displayed in the display unit 14 is information regarding the intermediate data, for example, the data size of the intermediate data generated by the arithmetic device 2, the number of pixels, or an image obtained by reducing an image indicated by the intermediate data.

The output unit 116 illustrated in FIG. 6 controls the image forming unit 17 to form an image corresponding to the intermediate data acquired by the acquisition unit 115, on a medium such as paper. In this case, the transfer unit 114 does not transfer data used in an arithmetic operation which is performed by the output unit 116 and is used for controlling the image forming unit 17, to the arithmetic device 2. Therefore, the arithmetic device 2 generates the intermediate data as the base of an image formed by the image forming unit 17, but does not control the image forming unit 17. That is, the control unit 21 of the arithmetic device 2 does not control hardware relating to image formation, for example, control of a timing at which an image is formed on a photosensitive member, or control of a timing at which paper is output.

The supply unit 118 may supply power to the connected arithmetic device 2. For example, in a case where the connection unit 16 is a USB, the supply unit 118 supplies power to the arithmetic device 2 via the connection unit 16.

The above-described detection unit 111 may check whether or not it is necessary to supply power to the connected arithmetic device 2. In this case, the supply unit 118 may supply the power to the arithmetic device 2 in which it is checked that the supply of power is necessary.

Operation of Information Processing System

Operation Before Connection

Figure 7:
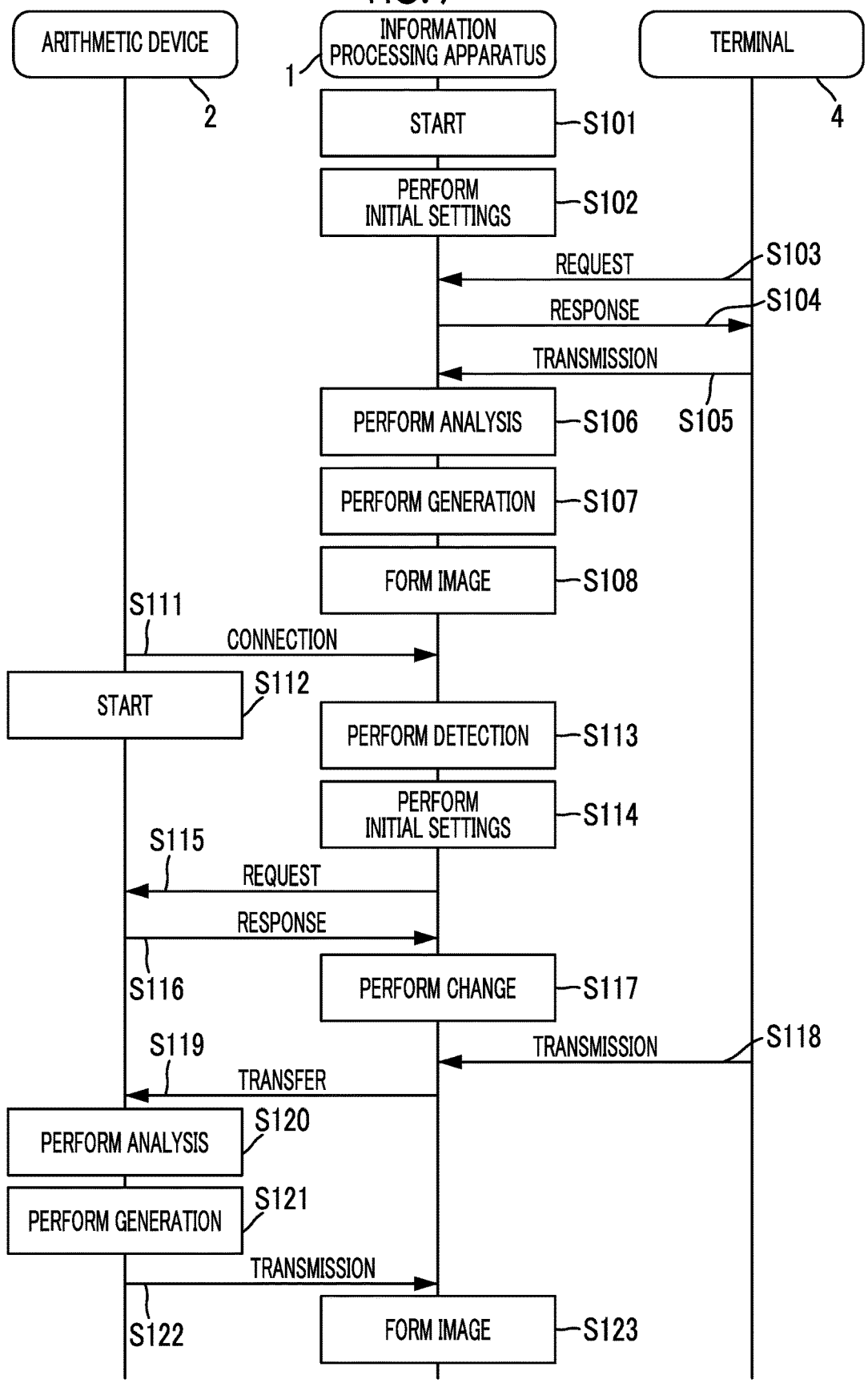
FIG. 7 is a sequence diagram illustrating a flow of an operation between the components of the information processing system 9.

FIG. 7 is a sequence diagram illustrating a flow of an operation between the components of the information processing system 9.

The control unit 11 of the information processing apparatus 1 starts the information processing apparatus in a manner that a user presses on a power button or the like which is not illustrated and is included in the operation unit 15 so as to supply power, and a program such as an operating system or an application is read from the storage unit 12 or the ROM (Step S101).

The control unit 11 checks the communication unit 13 and the connection unit 16 by the start and performs initial settings thereof (Step S102).

The control unit 41 of the terminal 4 requires information indicating the type of processing capable of being performed by the information processing apparatus 1, from the information processing apparatus 1 via the communication line 3 (Step S103).

The control unit 11 of the information processing apparatus 1 receives a request from the terminal 4, and responds to the request by transmitting information indicating the type of the processing capable of being performed by the information processing apparatus 1 to the terminal 4 (Step S104).

The control unit 41 of the terminal 4 causes the display unit 44 to display an operation screen and the like in which selecting processing capable of being performed by the information processing apparatus 1 is possible, based on the information transmitted as the response. The control unit 41 receives an operation of the user.

The control unit 41 receives an operation of the user, and thus transmits an instruction to perform various kinds of processing such as image formation or image processing, to the information processing apparatus 1 via the communication line 3 (Step S105).

The control unit 11 of the information processing apparatus 1 analyzes the transmitted instruction (Step S106). For example, in a case where the control unit 11 receives an instruction to form an image indicated by image data on a medium, from the terminal 4 along with the image data indicating an image described in the PDL or the like, the control unit 11 analyzes the image data.

For example, the control unit 11 generates intermediate data including a group of pixels arranged by the number of lattices depending on the size of a medium such as paper, from the image data described in a vector format, by the result of the analysis (Step S107). The control unit 11 forms an image on the medium using the generated intermediate data (Step S108).

Operation After Connection

In a case where the connection unit 26 of the arithmetic device 2 is inserted into the connection unit 16 of the information processing apparatus 1 so as to connect the arithmetic device 2 to the information processing apparatus 1 (Step S111), the arithmetic device 2 receives the supply of power from the information processing apparatus 1 and starts (Step S112). The control unit 11 of the information processing apparatus 1 detects the connection of the arithmetic device 2 (Step S113).

The control unit 11 receives a message indicating the connection of the arithmetic device 2 has been detected. Then, the control unit 11 performs initial settings of the connection unit 16 connected with the connection unit 26 of the arithmetic device 2 (Step S114). Thus, the control unit 11 specifies identification information of the arithmetic device 2, for example, in order to transmit and receive information via the connection unit 16. The identification information of the arithmetic device 2 refers to an address indicated in a manner of the above-described IPv4, for example.

The control unit 11 which has performed the initial settings of the connection unit 16 requires information indicating the type of arithmetic operation capable of being performed by the arithmetic device 2, from the connected arithmetic device 2 (Step S115).

The control unit 21 of the arithmetic device 2 receives the request from the information processing apparatus 1. The control unit 21 responds to the request by transmitting information indicating the type of arithmetic operation capable of being performed by the arithmetic device 2 to the information processing apparatus 1 (Step S116).

In a case where the control unit 11 of the information processing apparatus 1 receives the information indicating the type of arithmetic operation capable of being performed, from the arithmetic device 2, the control unit 11 changes the contents of the address table 121 based on the received information (Step S117).

The control unit 41 of the terminal 4 transmits an instruction to perform various kinds of processing such as image formation or image processing to the information processing apparatus 1 in accordance with an operation of the user, which has been received by the operation unit 45 (Step S118).

In a case where the control unit 11 of the information processing apparatus 1 receives the instruction to perform processing from the terminal 4, the control unit 11 specifies a set of a protocol of a communication in which the instruction has been performed and a port number of a port at which the instruction has been received. The control unit 11 searches for such a set from the address table 121. In a case where the set is shown, the control unit 11 transfers data used in the arithmetic operation capable of being performed by the arithmetic device 2 among pieces of processing as a target of the instruction, to the arithmetic device 2 (Step S119).

The control unit 21 of the arithmetic device 2 analyzes the transferred data (Step S120). The control unit 21 performs the arithmetic operation using the data, and generates intermediate data as a result of the arithmetic operation (Step S121). The control unit 21 of the arithmetic device 2 receives transfer of image data described in the PDL or the like from the information processing apparatus 1, for example. The control unit 21 performs an arithmetic operation such as rasterization on the received image data, and thereby generates the above-described intermediate data.

The control unit 21 of the arithmetic device 2 transmits the generated intermediate data to the information processing apparatus 1 (Step S122). The control unit 11 of the information processing apparatus 1 causes the image forming unit 17 to form an image by using the intermediate data which has been transmitted from the control unit 21 (Step S123). Before the control unit 11 causes the image forming unit 17 to form an image, the control unit 11 may perform another kind of processing. In a case where the control unit 11 performs "another kind of processing", the control unit 11 may use the above-described intermediate data, or may not use the intermediate data but use another kind of data.

With the above operations, in the information processing apparatus 1 referred to as an image forming apparatus in the embedded system, an arithmetic operation capable of also being performed by the connected arithmetic device 2 among arithmetic operations capable of being performed by the information processing apparatus is caused to be performed by the arithmetic device 2. For example, the total processing power is improved by connecting the arithmetic device 2 which is a general-purpose device having processing power higher than that of the information processing apparatus 1 to the information processing apparatus 1.

MODIFICATION EXAMPLES

Hitherto, the exemplary embodiment is described. The details of the exemplary embodiment may be modified as follows. The following modification examples may be combined.

Modification Example 1

In the above-described exemplary embodiment, the transfer unit 114 transfers data to the arithmetic device 2, and then the control unit 11 of the information processing apparatus 1 does not perform the arithmetic operation using the data. However, data may be transferred to the arithmetic device 2 and the arithmetic device 2 may perform the arithmetic operation, and the control unit 11 may also perform the arithmetic operation.

In a case where the arithmetic device 2 and the information processing apparatus 1 perform the arithmetic operation in parallel with each other, the control unit 11 may compare a result obtained by the arithmetic device 2 performing the arithmetic operation and a result obtained by the information processing apparatus 1 performing the arithmetic operation, and thus may verify the validity of either one by using the other.

One which is earlier obtained among the above-described two results may be used in post-processing. In this case, in a case one arithmetic operation does not end at a time point at which the other arithmetic operation ends, the control unit 11 may suspend the arithmetic operation which does not end.

Modification Example 2

In the above-described exemplary embodiment, the output unit 116 causes the display unit 14 to display information regarding the intermediate data generated by the arithmetic device 2. However, an output destination of such information is not limited to the display unit 14. The information output by the output unit 116 may be a result itself obtained by the arithmetic device 2 performing the arithmetic operation or may be information corresponding to the result. Examples of the information corresponding to the result obtained by the arithmetic device 2 performing the arithmetic operation include data indicating a result obtained by the information processing apparatus 1 performing another arithmetic operation by using the above result.

Modification Example 3

The arithmetic operation performed by the arithmetic device 2 may be capable of being performed by a general-purpose computer (information processing apparatus). In the above-described exemplary embodiment, the arithmetic device 2 is a stick PC. For exemplary embodiment, the arithmetic device may be a desktop type personal computer.

Modification Example 4

In the above-described exemplary embodiment, the information processing apparatus 1 includes the image forming unit 17 that forms an image corresponding to the result obtained by the arithmetic device 2 performing the arithmetic operation. However, the information processing apparatus may not include the image forming unit.

For example, the information processing apparatus 1 may be an image reading apparatus which includes an image reading unit that optically reads an image formed on paper or the like, and generates image data indicating an image read by the image reading unit.

For example, the information processing apparatus 1 may be an image transmitting apparatus such as facsimile, that generates image data indicating an image read by the image reading unit and transmits the image data to an external device via a communication line such as a public switched telephone network (PSTN) or an integrated services digital network (ISDN).

Modification Example 5

The detection unit 111 detects the connection of the arithmetic device 2 in a state where power is supplied to the information processing apparatus 1. However, the detection unit may detect the arithmetic device 2 which is already connected to the information processing apparatus 1 only in a case where the information processing apparatus starts, and then the detection unit 111 may not detect the arithmetic device 2 in the middle of the information processing apparatus 1 operating. In this case, the connection unit 16 of the information processing apparatus 1 may not correspond to hot swapping.

Modification Example 6

In the above-described exemplary embodiment, in a case where the arithmetic operation specified by the specifying unit 112 is determined to be performed by the information processing apparatus 1 before the connection with the detected arithmetic device 2, the storing controller unit 117 causes the information of the arithmetic device 2 as the transfer destination to be stored in the address table 121 of the storage unit 12. However, the control unit 11 may not cause the storage unit 12 to store the transfer destination. In this case, the storage unit 12 may not store the address table 121.

For example, when the control unit 11 receives an instruction of an arithmetic operation from the terminal 4, in a case where the arithmetic operation is determined to be performed by the information processing apparatus before the connection, the control unit 11 may require information indicating the type of arithmetic operation capable of being performed by the arithmetic device 2 from the connected arithmetic device 2. The control unit 11 may receive a response to the request, from the arithmetic device 2, and determine whether or not the arithmetic operation as a target of the instruction is capable of being performed by the arithmetic device 2. In a case where it is determined that the arithmetic operation as a target of the instruction is capable of being performed by the arithmetic device 2, the control unit 11 may transfer data used in the arithmetic operation to the arithmetic device 2.

In this case, processes from Step S115 to Step S117, which are performed with detection in Step S113 illustrated in FIG. 7 and initial settings of the subsequent Step S114 as triggers and are for specifying the arithmetic operation capable of being performed by the arithmetic device 2 are not performed. Instead, every time the instruction of Step S118 is transmitted, the control unit 11 of the information processing apparatus 1 inquires whether or not the arithmetic operation as a target of an instruction from the terminal 4 is capable of being performed by the arithmetic device 2. The control unit 11 determines whether or not data is transferred to the arithmetic device 2, in accordance with the response of the arithmetic device 2 to the inquiry.

Modification Example 7

In the above-described exemplary embodiment, in the type table 122 stored by the storage unit 12, the type of arithmetic operation capable of being performed by the information processing apparatus 1 is associated with the combination of the protocol and the port number used in the communication in which the terminal 4 performs an instruction to perform an arithmetic operation of such a type. However, for example, in a case where the instruction received from the terminal 4 includes identification information indicating the type of arithmetic operation, the type table 122 may simply store the type of arithmetic operation capable of being performed by the information processing apparatus 1. That is, the type table 122 may not associate the combination of the protocol and the port number with the type of arithmetic operation capable of being performed by the information processing apparatus 1.

In this case, in the type table 122, all types of arithmetic operations capable of being performed by the information processing apparatus 1 are exemplified. Thus, the storage unit 12 may store the contents corresponding to the type table 122 by a combination of a group of modules called by executing the program with a list of places at which the modules in the group are stored in the storage unit 12 and the like. The list of the places at the modules in the group are stored is a character string and the like obtained by concatenating a plurality of search paths, uniform resources identifiers (URIs), and the like with a predetermined delimiter.

Modification Example 8

In the above-described exemplary embodiment, the control unit 11 supplies power to the connected arithmetic device 2. However, in a case where the arithmetic device 2 includes an individual power source, the control unit 11 may not supply the power.

Modification Example 9

The program executed by the control unit 11 of the information processing apparatus 1 or the control unit 21 of the arithmetic device 2 may be provided in a state of being stored in a computer readable recording medium, for example, a magnetic recording medium such as a magnetic tape and a magnetic disk, an optical recording medium such as an optical disk, a magneto-optical recording medium, and a semiconductor memory. The program may be downloaded via a communication line such as the Internet. Various devices other than the CPU may be applied as control means exemplified by the control unit 11 or the control unit 21 as described above. For example, a dedicated processor or the like is used.

Modification Example 10

In the above-described exemplary embodiment, in a case where the receiving unit 113 receives an instruction to perform an arithmetic operation from the terminal 4, the transfer unit 114 determines whether or not the arithmetic operation as the target of the instruction is capable of being performed by the arithmetic device 2. However, in a case where the detection unit 111 detects the connection of the arithmetic device 2, the transfer unit 114 may determine whether or not the arithmetic operation performed by the control unit 11 is capable of being performed by the arithmetic device 2.

In a case where the arithmetic operation which is being performed by the control unit 11 is capable of being performed by the arithmetic device 2 and does not end, the control unit 11 may transfer data used in the arithmetic operation to the arithmetic device 2. In this case, the control unit 11 may stop or suspend the arithmetic operation which is being performed.

That is, in the modification example, in a case where the specified arithmetic operation is being performed by the information processing apparatus, the transfer unit 114 stops or suspends the arithmetic operation, and transfers data used in the arithmetic operation to the arithmetic device 2.

Modification Example 11

When the detection unit 111 detects the connection of the arithmetic device 2, in a case where it is determined that the arithmetic operation being performed by the control unit 11 is capable of being performed by the arithmetic device 2, the control unit 11 may determine whether or not data used in the arithmetic operation is transferred to the arithmetic device 2 in accordance with the progress of the arithmetic operation being performed.

For example, in a case where the progress of the arithmetic operation being performed by the control unit 11 is greater than a predetermined threshold, the control unit 11 continues the arithmetic operation in the middle of being performed, without transferring data to the arithmetic device 2. In a case where the progress of the arithmetic operation being performed by the control unit 11 is not greater than the above-described threshold, the control unit 11 transfers data to the arithmetic device 2. In a case where data is transferred to the arithmetic device 2, the control unit 11 may stop or suspend the arithmetic operation which is being performed.

That is, in the modification example, in a case where the specific arithmetic operation is being performed by the information processing apparatus, the transfer unit 114 realized by the control unit 11 transfers data to the arithmetic device 2 in accordance with the progress of the arithmetic operation. According to the configuration, for example, in a case where the threshold for the progress is set to 50%, the control unit 11 of the information processing apparatus 1 ends the arithmetic operation in the information processing apparatus 1 without causing the arithmetic device 2 to perform the arithmetic operation, when the arithmetic operation ends up to 70%. When the arithmetic operation ends only up to 30%, the control unit 11 stops or suspends performing of the arithmetic operation and causes the arithmetic device 2 to perform the arithmetic operation.

The control unit 11 may transfer data used in the arithmetic operation to the arithmetic device 2 along with information indicating the progress of the arithmetic operation which is being performed by the information processing apparatus. In this case, the control unit 21 of the arithmetic device 2 may determine whether or not the arithmetic device 2 performs the arithmetic operation, by comparing the received information on the progress and an estimated time to end the arithmetic operation in a case where the arithmetic device 2 performs the arithmetic operation. As a result of the determination, in a case where the control unit receives a notification of a message indicating the arithmetic device 2 performs the arithmetic operation, the control unit 11 of the information processing apparatus 1 may stop or suspend the above-described arithmetic operation which is being performed by the information processing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor, configured to:
   detect a connection of an arithmetic device and supply power to the connected arithmetic device;
   specify a first arithmetic operation capable of being performed by the arithmetic device;
   specify a second arithmetic operation capable of being performed by the information processing apparatus;
   determine whether the first arithmetic operation and the second arithmetic operation both comprise an overlapping arithmetic operation; and
   in response to the overlapping arithmetic operation comprised in both the first arithmetic operation and the second arithmetic operation:
   transfer data used in the overlapping arithmetic operation to the arithmetic device in a case where the second arithmetic operation is determined to be performed by the information processing apparatus before the connection; and
   acquire a result obtained from the arithmetic device performing the first arithmetic operation comprising the overlapping arithmetic operation using the data.

2. The information processing apparatus according to claim 1,
   wherein, after the processor transfers the data used in the overlapping arithmetic operation to the arithmetic device, the overlapping arithmetic operation is not performed by the information processing apparatus.

3. The information processing apparatus according to claim 1, wherein the processor is further configured to:
   output information corresponding to the acquired result.

4. The information processing apparatus according to claim 2, wherein the processor is further configured to:
   output information corresponding to the acquired result.

5. The information processing apparatus according to claim 1,
   wherein, the arithmetic device is a general-purpose device that performs the first arithmetic operation in accordance with a designated program.

6. The information processing apparatus according to claim 5,
   wherein the first arithmetic operation performed by the arithmetic device is capable of being performed by a general-purpose information processing apparatus.

7. The information processing apparatus according to claim 3,
   wherein the processor controls an image forming apparatus to form an image represented by the output information, and
   the processor does not transfer data used in an arithmetic operation which is used for controlling the image forming apparatus.

8. The information processing apparatus according to claim 4,
   wherein the processor controls an image forming apparatus to form an image represented by the output information, and
   the processor does not transfer data used in an arithmetic operation which is used for controlling the image forming apparatus.

9. The information processing apparatus according to claim 1,
   wherein the processor detects a connection of a new arithmetic device in a case where the new arithmetic device is connected to the information processing apparatus in a state where power is supplied to the information processing apparatus.

10. The information processing apparatus according to claim 9, further comprising:
    a memory that stores a transfer destination of the data,
    wherein the processor controls the memory to store the arithmetic device as the transfer destination in a case where the second arithmetic operation is determined to be performed by the information processing apparatus before the connection, and
    wherein the processor transfers data used in the overlapping arithmetic operation to the transfer destination stored in the memory.

11. The information processing apparatus according to claim 1,
    wherein the processor checks whether or not it is necessary to supply power to the connected arithmetic device, and
    the processor supplies the power to the arithmetic device checked to have a need for the supply of the power.

12. A non-transitory computer readable medium storing a program causing a computer to:
    detect a connection of an arithmetic device and supply power to the connected arithmetic device;
    specify a first arithmetic operation capable of being performed by the arithmetic device;
    specify a second arithmetic operation capable of being performed by the information processing apparatus;
    determine whether the first arithmetic operation and the second arithmetic operation both comprise an overlapping arithmetic operation; and
    in response to the overlapping arithmetic operation comprised in both the first arithmetic operation and the second arithmetic operation:
    transfer data used in the overlapping arithmetic operation to the arithmetic device in a case where the second arithmetic operation is determined to be performed by the computer; and acquire a result obtained from the arithmetic device performing the first arithmetic operation comprising the overlapping arithmetic operation using the data.

* * * * *